Nov. 7, 1944.   J. DUSEVOIR   2,362,364
METHOD OF SERRATING METALLIC BODIES
Original Filed Nov. 12, 1941
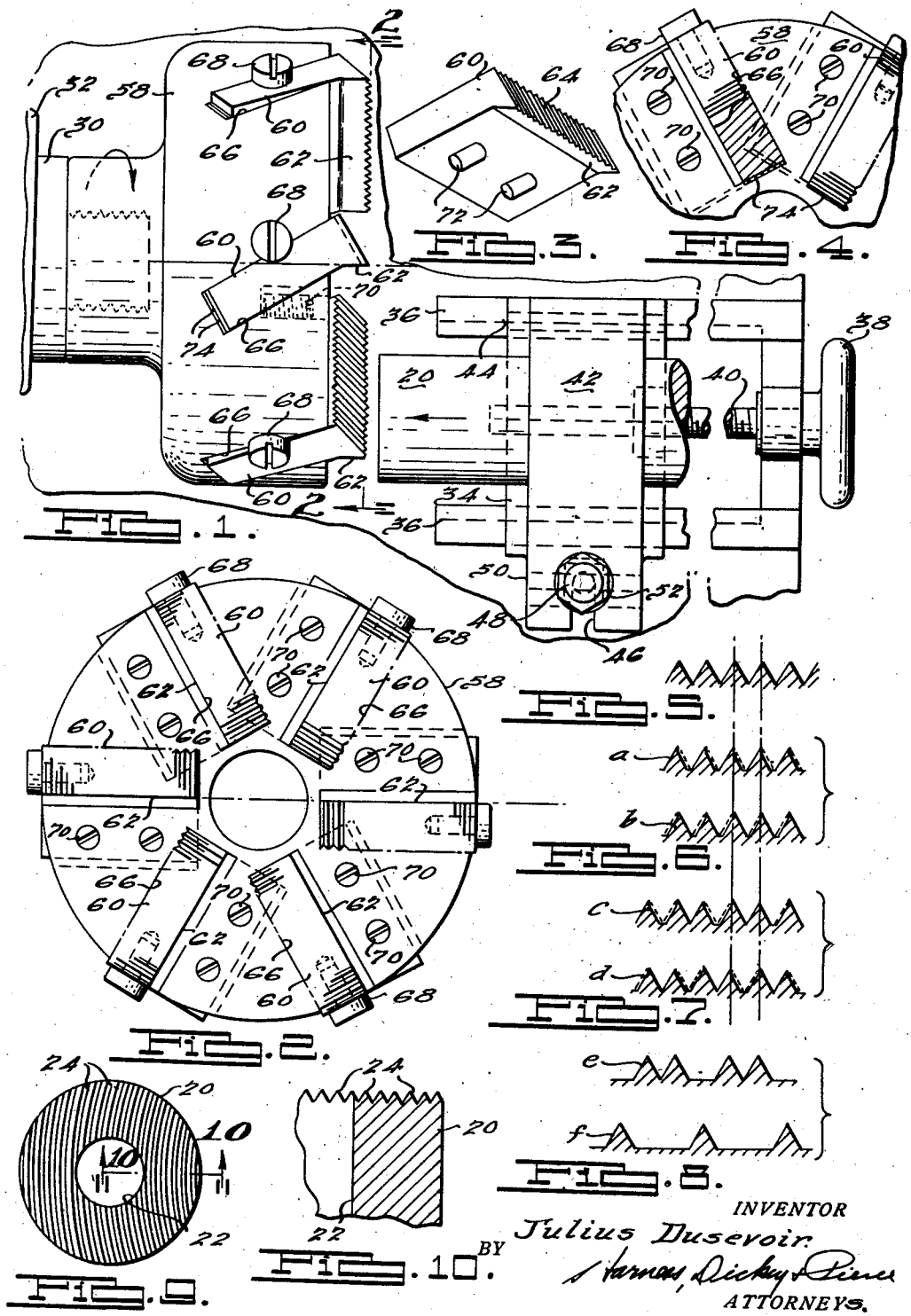
INVENTOR
Julius Dusevoir.
BY
ATTORNEYS.

Patented Nov. 7, 1944

2,362,364

UNITED STATES PATENT OFFICE 2,362,364

METHOD OF SERRATING METALLIC BODIES

Julius Dusevoir, Dearborn, Mich., assignor to Century Motors Corporation, Dearborn, Mich., a corporation of Michigan Original application November 12, 1941, Serial No. 418,678, now Patent No. 2,317,262, dated April 20, 1943. Divided and this application July 6, 1942, Serial No. 449,885

3 Claims. (Cl. 90—11)

This invention relates to a method of forming curved serrations in metallic bodies and has for its principal object the provision of such method that is simple in use and by the practice of which objects may be serrated in an accurate and economical manner, and is a division of my application for Letters Patent of the United States for improvements in Apparatus for machining serrations in metallic bodies, filed November 12, 1941, and serially numbered 418,678, which is now Patent No. 2,317,262, dated April 20, 1943.

Objects of the invention include the provision of a method of machining curved serrations in a metallic surface whereby smooth serrations are formed with the expenditure of a small amount of power; the provision of a method of forming curved serrations in opposite ends of a metallic part so that the serrations at one end thereof will bear a predetermined relation with respect to the serrations at the opposite end thereof; the provision of a method of forming curved serrations in a metallic surface by the use of serrated cutter blades so constructed and arranged as to remove metal from the surface in a pre-selected manner; the provision of a method as above described in which metal is removed from one side only of at least part of the serrations being formed in the work at one moment and metal is removed from other sides of such serrations being formed in the work at a subsequent moment; and the provision of a method as above described in which metal is removed from different portions of the serrations being formed in the work at different moments in the operation, but the machining of all serrations proceeds simultaneously.

The above being among the objects of the present invention the same consists in certain novel steps of operation to be hereinafter described in connection with the apparatus shown in the accompanying drawing, and then claimed, having the above and other objects in view.

In the accompanying drawing which illustrates a suitable embodiment of apparatus by means of which the method of the present invention may be carried out and in which like numerals refer to like parts throughout the several different views, Fig. 1 is a fragmentary, partially broken, plan view of a machine constructed to carry out the method of the present invention in the formation of curved serrations in an end face of a cylindrical piece of work;

Fig. 2 is a face view of a cutter head illustrated in Fig. 1, taken as looking on the line 2—2 of Fig. 1;

Fig. 3 is a perspective view of one of the cutter blades employed in the cutter head shown in the preceding view;

Fig. 4 is a fragmentary view similar to Fig. 2 but illustrating the manner in which the cutter blades are shifted in the head for the purpose of machining a piece of work to be mated with one which has been serrated previous to such shifting;

Figs. 5 to 8, inclusive, are more or less diagrammatic fragmentary views illustrating different forms of cutting teeth for the cutter blades shown in the preceding views;

Fig. 9 is a view of the piece of work shown mounted in the machine in Fig. 1 after it has been serrated; and, Fig. 10 is an enlarged fragmentary sectional view taken on the line 10—10 of Fig. 9.

The present invention is applicable for use in the forming of curved serrations on a surface of a part which is adapted to be arranged in abutting relation with respect to a complementarily serrated surface of another part adapted to be connected thereto. The interfitting curved serrations of the two faces in such case serve as a means for preventing relative displacement between the two parts in the plane of their mating faces except in the direction of the serrations themselves. Broadly speaking such serrated connections may be employed between any two members having abutting faces regardless of the character or construction of the members. However, one such use is in the connection between the various separately formed parts of a built up crankshaft such as shown and claimed in my United States Letters Patent No. 2,013,039, issued September 3, 1935, on Crankshaft, and as also shown in my co-pending application for Letters Patent of the United States for improvements in Crankshaft, filed July 31, 1941, and serially numbered 404,756. Where such serrated connections are to be employed between the various elements of a built-up machine part, such as the crankshaft disclosed in my above identified United States Letters Patent and application for Letters Patent, it is essential in obtaining the desired final result that serrations on opposed faces of such elements be accurately formed and, where one or more of the elements are to be interchangeable with other similarly formed elements, it will be appreciated that a uniformity in the size, contour and location of such serrations is necessary in order to obtain the desired results.

The present invention provides a method by means of which such uniformity of result may be obtained in a desired state of accuracy and finish and with the expenditure of a minimum amount of power in carrying it out.

In the broader aspects of the invention it makes no difference what type of apparatus is employed as long as such apparatus is provided with a cutting head having cutter blades providing radially disposed cutting edges complementary in whole or in part to the desired serrations to be formed in the work, together with suitable means for presenting the work to the cutter. In other words it may be the particular type of apparatus disclosed and claimed in the parent application of which the present invention is a division and which has been previously identified herein, it may be the particular type of apparatus disclosed and claimed in the co-pending application for Letters Patent of the United States of Frank M. Smith for improvements in Apparatus for machining serrations in metallic bodies, filed on the 12th day of November, 1941, and serially numbered 418,693, now Patent No. 2,318,262, dated May 4, 1943, it may be the specific type of apparatus disclosed and claimed in the co-pending application for Letters Patent of the United States for improvements in Apparatus for machining serrations in metallic bodies, filed by René H. Toubhans on December 19, 1941, and serially numbered 423,641, now Patent Number 2,327,944, dated August 24, 1943, or any other suitable apparatus. For the purpose of illustration the particular apparatus shown herein is that disclosed and claimed in my co-pending parent application above identified of which the present application is a division.

In the drawing, by way of illustration only, and as indicated in Figs. 1, 9 and 10, the piece of work there shown comprises a shaft section or other cylindrical piece of work 20 having a central bore 22 and an end face arranged in perpendicular relation with respect to its axis. As best brought out in Figs. 9 and 10 which shows such piece of work 20 with its end surface in finished serrated condition, such end face is provided with a multiplicity of parallel serrations 24 thereon, such serrations being of curved conformation struck from a center outside of the periphery of the piece of work and, of course, of uniform size throughout. While in the broader aspects of the invention the particular cross-sectional contour of the serrations 24 may vary considerably as long as such contour is such as to permit the serrations on a pair of members to be connected thereby to be readily interfitted by engagement of and disconnected from each other through separation of, the serrated faces, for the purpose of illustration the serration 24, as best brought out in Fig. 10, are of triangular section having straight sides all disposed at equal angles with respect to the general plane of the surface on which they are formed.

In machining the serrations in accordance with the present invention any suitable machine tool may be employed that is provided with a rotatable spindle and a support, that may be moved relative to each other in the general direction of the axis of the spindle. An ordinary lathe is illustrative of this type of machine tool, is satisfactory for use in accordance with the present invention, and is assumed to be shown in Fig. 1. As indicated in that figure the lathe spindle is indicated at 30 and as being rotatably supported in a suitable or conventional spindle bearing 32. A V-block 34 is suitably mounted upon the bed of the lathe in parallelism with but eccentric to the axis of rotation of the spindle 30 for movement in a direction parallel to the axis of the spindle 30 towards and away from the same. The V-block may thus be mounted upon the usual carriage of the lathe or, as indicated in Fig. 1, it may be mounted upon a pair of ways such as 36 suitably secured to the bed of the lathe and controlled in its position axially of the spindle 30 by means of a hand wheel such as 38 and screw 40. The work 20 is received by the V-block 34 and, therefore, arranged with its axis parallel to the axis of the spindle 30, and may be clamped against movement in the V-block 34 in any suitable manner. The particular means shown consists of a clamping bar 42 hinged at one end to one side of the V-block 34 by means of a pin such as 44, and is slotted as at 46 at its opposite end for reception of a bolt 48. The bolt 48 is pivoted at its lower end by means of a pin 50 to the V-block 34 so as to enable its opposite end to swing into and out of the slot 46. The bolt 48 carries a nut 52 at its upper end which when drawn down while the upper end of the bolt 48 is within the slot 46 securely clamps the work 20 in the V-block 34. By loosening the nut 52 the upper end of the bolt 48 may be swung outwardly out of the notch 46 thus permitting the clamp 42 to be swung upwardly about the axis of the pin 44 and permitting the work 20 to be removed and replaced by new work.

In order to form the serrations in the end face of the work 20 a head indicated generally at 58 is mounted upon the end of the spindle 30 in a conventional manner. In accordance with the present invention the head 58 carries one or more cutter blades 60 therein, six such cutter blades being shown in the drawing by way of illustration and at least this number being preferable in actual practice. Each cutter blade 60, as best brought out in Fig. 3, comprises a rectangular sectioned main body portion of uniform thickness and a cutting edge portion having an angularly offset cutting face 62 and an adjoining serrated end face 64. As indicated in Fig. 1 the blades 60 are received in slots 66 formed in the head 58 and opening both on the front axial face of the head 58 and on the periphery thereof. The plane of thickness of each slot 66 is such, with respect to the axis of the head 58 and the angularity of the face 62 with respect thereto, that when the blades 60 are received in their corresponding slots 66 the cutting edge portion only of the blades 60 project axially beyond the outer face of the head 58 and the face 62 is arranged in a plane including the axis of rotation of the head 58. In other words the faces 62 of the cutter blades 60 are radially disposed with respect to the axis of rotation of the head 58. It will be appreciated that for this arrangement it is necessary for each slot 66, in extending axially away from the front face of the head 58 to be inclined in the direction of normal rotation of the head 58 as best shown in Fig. 1.

Each blade 60 is held against radial displacement of the head 58 by means of a screw 68 threaded radially into the head 58 in adjacent relationship with respect to each slot 66 and with its head partially overlapping the radially outer edge of the associated cutter blade 60. Each cutter blade 60 is maintained axially of the head 58 in the bottom of its associated slot 66 by means of a pair of screws 70 which thread through the axially outer face of the head 58 in parallel relation with respect to the axis of rotation thereof and, projecting into the corresponding slots 66, bear against seats 72 formed in each cutter blade 60 as best illustrated in Fig. 3. In this latter connection it may be noted that one or more shims or spacers 74 are preferably, but not necessarily, inserted in the inner axial end of each slot 66 for spacing the corresponding edge of the corresponding cutter blade from such end of the slot and, therefore, control the amount which the cutter blades project axially outwardly beyond the outer axial face of the head 58.

The angularity of the serrated end face 64 of each cutter blade 60 is such as to provide ample clearance for the cutting edge of the blade in operation. The serrations themselves are of such size and contour that, when viewed in a direction perpendicular to the face 62, they are complementary in whole, or in part as will hereinafter be more fully explained, with the exact size, shape and contour of the serrations which it is desired to form in the work, in other words and in the particular embodiment shown, with the serrations 24. Where the serrations of the blades 60 are thus exactly complementary to the serrations 24 to be formed in the work they will then appear, as viewed perpendicularly with respect to their corresponding cutter face 62, as indicated in Fig. 5.

Assuming for the moment that the serrated edges of the blades 60 are of the conformation illustrated in Fig. 5 and as above explained, then the cutters may be adjusted in the head 58 to serrate the work in accordance with either of two methods. The simplest and preferred method is to adjust all of the cutter blades 60 so that their serrated edges project exactly the same distance outwardly from the outer axial face of the head 58 and, of course, so that each serration of the cutting edge of each blade will lie in the same circle about the axis of rotation of the head 58 as the corresponding serrations on each of the remaining cutter blades 60. This last feature is preferably obtained by making the radial end walls of all of the slots 66 at exactly the same distance from the axis of rotation of the head 58 and machining all of the cutter blades 60 so that all of the serrations thereon bear exactly the same relation with respect to that end thereof which is to abut against such radial inner wall of the slots 66.

With the various cutter blades 60 located as above described and assuming that the V-block 34 is so located as to support the work at the desired distance from the axis of rotation of the head 58 to obtain the proper degree of curvature to the serrations 24 to be formed thereon, the head 58 is caused to be rotated and the work 20 is fed axially into engagement with the cutter blades 60, in the particular case shown by rotation of the wheel 38. The work is slowly fed into the rotating cutter blades and the serrated edges of the latter thus act to remove metal therefrom in exact accordance with the serrated edges of the blades, and the feeding movement of the work into the cutter blades is continued until the end surface of the work 20 is provided with complete serrations thereon.

The other method of forming the serrations on the end surface of the work 20 consists in adjusting the various cutter blades 60 so that each successive cutter blade 60 over one complete turn of the head 58 projects a slightly greater amount than the preceding blade axially outwardly from the end face of the head 58. Preferably in such case the amount one cutter blade projects outwardly beyond its next preceding cutter blade in the direction of rotation of the head 58 decreases. In such case the head 58 when stationary is positioned in such a rotatable position that the cutter blade 60 projecting the least amount from the end face of the head 58 will first engage the work, and the work is initially moved to or located axially of the head 58 at a predetermined position which will insure complete machining of the serrations thereon, and is locked against movement. The head 58 is then caused to turn through one complete revolution under which condition each cutter blade 60 in moving over the end of the work will remove in one pass its share of the entire metal to be removed from the end of the piece of work and, after the last cutter has passed over the end of the work the serrations 24 on the work will have been completely formed. Thus in accordance with this method only one complete revolution of the cutter head 58 is necessary to completely machine the serrations in the end of the work. When such method is followed, then it is preferable to use a greater number of cutter blades 60 than shown although the method may be carried out with the number of cutter blades shown if necessary. The reason for desiring the greater number of cutter blades in such case is that the last two or three cutters in such case should be adjusted to remove a very slight amount of metal only so as to result in serrations on the work having a high degree of finish It will be appreciated that if two cylindrical pieces of work, such as the workpiece 20 illustrated, or equivalent pieces of work, are supported in the same position in the machine and serrated with the same positioning of the cutter blades 60, when the two pieces of work are positioned with their serrated faces in contact the serrations of both pieces cannot be arranged in interfitting relation with respect to each other. This is because the high points of the serrations on one of the pieces must fit within the low points of the serrations of the other of the pieces to effect a perfect interfitting relationship, requiring the high points of the serrations on one piece to correspond in curvature to the low points of the serrations on the other piece, whereas, under the conditions assumed, the high points of the serrations on both pieces are struck from equivalent centers. Accordingly, in order to have the serrations of one of the pieces accurately interfit with the serrations of the other of the pieces when such pieces are arranged in end-to-end relationship, it is necessary that the serrations of one piece be offset from the serrations of the other piece about a common center for all of the serrations by a distance equal to half the pitch of, or distance between, the serrations.

In order to permit this desired arrangement of interfitting serrations to result by the use of the apparatus shown, after one of the pieces has been machined in accordance with either of the methods above described, the blades 60 are loosened in their respective slots 66 and a shim 74, illustrated in Fig. 4, is inserted between the radially inner end of each cutter blade 60 and the corresponding end of its slot 66, after which the cutter blades 60 are re-secured in position. The shims 74 in such case are of a thickness such as to shift the cutter blades 60 outwardly in their respective slots 66 an amount to bring the high points of the serrations of the blades in alignment, radially of the head 58 with those points at which the low points of the serrations were formerly located during the preceding machining operation. Accordingly, when another piece is then machined with the cutter blades 60 readjusted as described and as indicated in Fig. 4, the serrations 24 which will be formed upon the corresponding piece of work, will be struck from a center corresponding exactly to the center from which the previous serrations were struck, but the serrations in this case will have their high points located radially from such center from the high points of the serrations formed on the previous member by a distance equal to half of the distance between the serrations. Accordingly, in such case, when the two parts or pieces are placed in end-to-end relationship with the serrated faces abutting, the serrations of one of the pieces may be perfectly interfitted with the serrations of the other piece and the desired relation of parts thus obtained. With such arrangement of serrations on two pieces, where the two pieces are cylindrical shafts or shaft sections, for instance, the two shafts may, as will be readily appreciated, be arranged in concentric relation with respect to each other and with the serrations of both pieces accurately interfitting one another so that while the serrations of the two pieces are maintained in interfitting relationship relative movement between the abutting faces of the two pieces in the plane of abutment is positively prohibited excepting only in the direction of length of the serrations.

Particularly in following out the method first described in employing the tool for forming serrations on a piece of work, the use of serrations of the type shown in Fig. 5 on the cutter blade 60 has certain inherent disadvantages. These disadvantages are that while a cutter blade 60 is passing over a piece of work both sides of the serrations of the cutting edge thereof in contact with the work are removing metal from the work. Consequently a maxmium net linear length of cutting edge is in contact with the work which involves the expenditure of a maximum amount of power to accomplish the cutting action. Furthermore, experience has shown that when it is attempted to remove metal from both sides of the serrations being formed in the work it is considerably more difficult to obtain a smooth surface on the serrations being formed. To obviate this disadvantage, that is, to enable the employment of a smaller amount of power in effecting the operation and to obtain a smoother surface for the serrations in the final piece of work, various arrangements and formation of the serrations on the cutter blades may be resorted to.

For instance, as illustrated in Fig. 6 the sides of the serrations on one cutter blade 60 may be relieved while the opposite sides of the serrations on the following cutter blade 60 may be relieved. In other words, as indicated by $a$ in Fig. 6, one cutter blade may have the same side of all of its serrations, indicated as the righthand side in Fig. 6, relieved from the form of the true serrations on such side and which true formation is indicated by the dotted lines. The serrations of the next cutter blade, in the direction opposite to the direction of rotation of the head 58, may have the serrations thereof, indicated in Fig. 6 by $b$, relieved on the opposite sides of the serrations, namely the lefthand side as indicated from the true form of the serrations for such sides as indicated by the dotted lines. In such case the cutter blades with the type of serrations indicated at $a$ will remove metal only from one side of the serrations being formed in the work, while the following cutter blades equipped with the serrations of the type illustrated at $b$ will remove metal from the opposite sides of the serrations being formed in the work. Consequently, with the arrangement of serrations illustrated in Fig. 6 the effective linear dimensions of the cutting edges of the blades 60 are reduced by half as compared to the form shown in Fig. 5, and at the same time it has been found that a smoother finish is imparted to the serrations being formed in the work.

On the other hand, the serrated cutting edges of alternate cutting blades 60 may be relieved as indicated at $c$ in Fig. 6 while the remaining cutter blades may be relieved as indicated at $d$ in Fig. 6. It will be noted that in the serrations indicated at $c$ the opposed faces of every other pair of serrations are relieved from the true form of tooth indicated by the dotted lines. The same is true in the construction shown at $d$ but the teeth $d$ are relieved on those surfaces thereof corresponding with the unrelieved surfaces in the serrations $c$. Thus the cutter blades having the teeth relieved as in $c$ of Fig. 6 will machine alternate serrations in the piece of work radially outwardly from the center of rotation of the cutter head while the following cutter blades will machine those alternate serrations not machined by the preceding cutter blades and will not machine those alternate serrations machined by the preceding cutter blades. The same result is obtained with the construction shown in Fig. 6 as with the construction shown in Fig. 5 as far as reducing the net linear length of the cutting edges on each cutter blade is concerned.

A different arrangement of cutter blade serrations is illustrated in Fig. 8. In the arrangement of serrations shown at $e$ every third serration on the cutting edge of the cutter blade is eliminated while in the following cutter blade illustrated at $f$ all of the serrations on the cutting edge of the blade are eliminated with the exception of those in line with those eliminated from the arrangement of teeth shown in $e$. Thus this illustrates another arrangement wherein the serrated edges of one cutter blade act upon only part of the surface of the work being machined, while a following cutter blade acts only upon that part of the work not machined by the preceding blade. This construction likewise reduces the length of the cutting edge of each cutter blade as compared to the construction illustrated in Fig. 5 and, consequently, reduces the amount of power required to perform the operation.

It will be appreciated by those skilled in the art that any desired combination of the arrangement of serrations illustrated in Figs. 5 to 8, inclusive, may be employed for the cutter blades in one tool. That is, any combination of relief or tooth arrangement illustrated in Figs. 5 to 8, inclusive, may be employed when desired in order to improve the characteristics of the machine tool employed to perform the work or the quality of the work itself.

It will be appreciated by those skilled in the art that by positioning the cutting faces 62 of the various blades 60 radially of the axis of rotation of the head 58, and particularly disposing the cutting edges of the various blades 60 in radial relation with respect to the axis of rotation of the head 58, the shaping of the serrated edges 64 of the blades 60 to produce serrations of predetermined size and shape in the finished product is materially simplified as compared to any other arrangement. It will also be appreciated that the particular size and conformation of the serrations in the end surface 64 of the blades 60 having been determined for a radial position of the serrated cutting edges in the head 58, any variation of these cutting edges out of such radial relation would vary the size, shape and contour of the serrations in the final product from that desired. Some means or method must be employed in the practical application of such tool so that in re-sharpening the blades the new cutting edges thus formed will be re-located in correct radial relation with respect to the axis of rotation of the head 58 if a uniformity in the serrations on the finished work is to result. This is readily accomplished in accordance with the construction shown in the following manner. According to one method each blade 60 may seat directly on the bottom of its corresponding slot 66 axially of the head 58, that is without the interposition of the shims 74. In such case when the blades become worn they may be removed from the head 58, and that end face of each one opposite the serrated end 64, may be ground or otherwise machined to remove a predetermined thickness of metal therefrom, after which the blades may be reinserted in place in their respective slots 66 and secured therein. It will be appreciated that because of the angular disposition of the general plane of thickness of the slots 66 with respect to the axis of rotation of the head 58, that under such circumstances the cutting face 62 of each blade 60 will be moved, in the normal direction of movement of the head 58, out of its originally true radial relation with respect to the axis of rotation of the head 58. On the other hand, where the shims 74 are provided as shown and previously described, under such conditions the blades 60 may be loosened in their respective slots and one or more of the shims 74 removed after which the blades may be reinserted and under which condition a relative advancing movement of the cutting face 62 of the various blades, in the direction of normal rotation of the head 58, will have occurred in the same manner as would occur where stock is removed from the corresponding ends of the blades. The head 58 with the blades 60 thus shifted and re-secured in place therein is, under either of the above conditions, then placed in a suitable grinder and stock is removed from the face 62 of each blade until such face 62 is again located radially with respect to the axis of rotation of the head 58. It will be appreciated that in removing stock from the face 62 the worn cutting edge is removed and a new cutting edge is established identical with the original cutting edge inasmuch as the serrations on the end faces 64 of the cutter blades 60 are uniform in size and shape throughout. Thus by the above described method not only are the blades 60 re-sharpened but they are automatically re-located with their cutting edges in the desired radial relation with respect to the axis of rotation of the head 58. The method automatically eliminates the necessity of re-locating cutter blades after sharpening as is usually he case in connection with removable blade cutters.

Having thus described my invention what I claim by Letters Patent is:

1. The method of forming curved serrations in a flat surface of each of two parts so that said parts may be arranged with said surfaces in abutting relationship and with the serrations thereon in accurately interfitting relationship, by means of a rotatable head provided with a cutter blade having a serrated cutting edge, comprising the steps of mounting one of said parts with said surface thereof in predetermined relationship with respect to the axis of rotation of said head and effecting relative feeding movement between said one of said parts and said head whereby to effect a machining of said surface thereof by said serrated cutting edge to form serrations on said surface, removing said one of said parts and replacing it by the other of said parts, shifting said cutter blade radially of the axis of rotation of said head by an amount sufficient to locate high points of the serrations of said cutting edge at the same radial distance from the axis of rotation of said head at which low points of said serrations were located when machining the first of said parts, then effecting relative movement between said other of said parts and said head whereby to machine said surface of said other of said parts by said cutting edge to form serrations thereon.

2. The method of machining a surface of each of two parts to provide curved serrations thereon capable of accurately intermeshing when said surfaces are abutted one against the other, by means of a cutter blade having a serrated cutting edge complementary to the serrations to be cut in said parts, comprising the steps of mounting said cutter blade and one of said parts for relative rotation about a predetermined axis, effecting a relative feeding movement between said cutting blade and said one of said parts whereby to machine serrations on said surface of said one of said parts, replacing said one of said parts with the other of said parts, shifting said cutter blade relative to said axis of rotation by an amount sufficient to bring the high points of the serrated cutting edge thereof to the same radial location with respect to the axis of rotation as the low points thereof were formerly located, and then effecting a relative feeding movement between said other of said parts and said cutting edge to machine serrations on said surface of said other of said parts.

3. The method of machining a flat surface of each of two parts to provide curved serrations thereon capable of accurately intermeshing when said surfaces are abutted one again the other, by means of a plurality of cutter blades having serrated cutting edges complementary in total effect to the cross-sectional configuration of the serrations to be cut in said parts, comprising the steps of mounting said cutter blades and one of said parts for relative rotation about a predetermined axis and with the high points of the serrated cutting edges of each thereof circularly aligned with corresponding high points of the remainder thereof about said axis, effecting a relative feeding movement between said cutting blades and said one of said parts whereby to machine serrations on said surface of said one of said parts, replacing said one of said parts with the other of said parts, shifting said cutter blades relative to said axis of rotation by an amount sufficient to bring high points of the serrated cutting edges thereof to the same radial location with respect to the axis of rotation as the low points thereof were formerly located, and then effecting a relative feeding movement between said other of said parts and said cutting edge to machine serrations on said surface of said other of said parts.

JULIUS DUSEVOIR.

CERTIFICATE OF CORRECTION.

Patent No. 2,362,364. November 7, 1944.

JULIUS DUSEVOIR.

It is hereby certified that error appears in the above numbered patent requiring correction as follows: In the grant, line 13, name of assignee, for "Centruy Motors Corporation" read --Century Motors Corporation--; page 4, first column, line 44, for "maxmium" read --maximum--; and second column, line 15, for "cutting" read --cutter--; page 5, first column, line 68, for "he" before "case" read --the--; and second column, line 51, for "again" read --against--; and that the said Letters Patent should be read with this correction therein that the same may conform to the record of the case in the Patent Office.

Signed and sealed this 6th day of February, A. D. 1945.

Leslie Frazer (Seal) Acting Commissioner of Patents.